United States Patent [19]
Yoshimatsu

[11] Patent Number: 5,201,036
[45] Date of Patent: Apr. 6, 1993

[54] DATA PROCESSOR HAVING WAIT STATE CONTROL UNIT

[75] Inventor: Norifumi Yoshimatsu, Tokyo, Japan

[73] Assignee: NEC Corporation, Tokyo, Japan

[21] Appl. No.: 619,198

[22] Filed: Nov. 29, 1990

[30] Foreign Application Priority Data

Nov. 28, 1989 [JP] Japan ............................ 1-310102

[51] Int. Cl.$^5$ ............................................. G06F 9/00
[52] U.S. Cl. ............................. 395/325; 395/725; 364/240.5; 364/271.5; 364/DIG. 1; 364/926.91; 364/DIG. 2
[58] Field of Search ............. 395/725, 325, 275; 364/240.5, 271.5, 271.6, DIG. 1, 926.91, 934.6, DIG. 2

[56] References Cited

U.S. PATENT DOCUMENTS

| | | | |
|---|---|---|---|
| 4,787,032 | 11/1988 | Culley | 395/725 |
| 4,802,120 | 1/1989 | McCoy | 395/550 |
| 5,032,982 | 7/1991 | Dalrymple et al. | 395/550 |
| 5,070,473 | 12/1991 | Takano et al. | 395/725 |

FOREIGN PATENT DOCUMENTS

| | | |
|---|---|---|
| 0260568 | 7/1987 | European Pat. Off. |
| WO8902128 | 3/1989 | World Int. Prop. O. |

OTHER PUBLICATIONS

Electronic Engineering, Mar. 1983, pp. 103-105.

*Primary Examiner*—Michael R. Fleming
*Assistant Examiner*—Glenn A. Auve
*Attorney, Agent, or Firm*—Whitham & Marhoefer

[57] ABSTRACT

A data processor (1) includes a wait state control unit (6) for generating a ready signal for instructing a bus control unit (3) to insert a wait state into a bus cycle being performed. The bus control unit performs a bus cycle with first and second states (T1 and T2). The wait state control unit includes a bus cycle judgement circuit, a register, a wait cycle selector/decoder, a wait cycle presence/absence detector for detecting whether or not a wait state is to be inserted into the bus cycle, and a ready signal generator for generating a ready signal in response to the detection signal from the wait cycle presence/absence detector for generating the ready signal in response to the detection signal irrespective of the absence of the decoded wait cycle number from the wait cycle selector/decoder. Thus, the wait cycle presence/absence detector, which detects only the requirement of the insertion of a wait state, causes the ready signal to be generated to the bus control unit even though the number of wait states has not been decoded by the end of the second state.

9 Claims, 4 Drawing Sheets

DATA PROCESSOR HAVING WAIT STATE CONTROL UNIT

BACKGROUND OF THE INVENTION

The present invention relates to a data processor such as a microprocessor or a microcomputer and, more particularly, to a wait state control unit in a data processor for controlling the insertion of one or more wait states into a sequence of states for performing each bus cycle.

A data processor constitutes an information processing system together with a memory unit and a plurality of peripheral I/O (Input/Output) units. When the data processor reads or writes data from or into the memory units and the peripheral I/O units, it performs a data read or a data write bus cycle in accordance with a sequence of states, the number of which is determined by a bus control unit of the data processor and consists of a few states in general. Each of the states corresponds to one cycle period of a system clock signal.

As well known in the art, an information processing system does not always employ memory devices constituting the memory unit and the peripheral I/O units each having a high speed access time. One or more memory devices and/or one or more peripheral I/O units having a low speed access time may be employed. In such a case, necessary data may not be read or written from or into the memory device and the I/O unit within an access time determined by the bus cycle of the bus control unit.

In order to overcome this shortcoming, a wait state control unit is provided in the data processor for controlling or prolonging the bus cycle of the data processor. This unit generates a ready signal in response to a bus cycle to be performed to inform the bus control unit of the unit currently accessed having the low speed access time. As long as the ready signal is generated, the bus control unit inserts a wait state into the sequence of states for performing the bus cycle. The wait state control unit includes a bus cycle judgement circuit for judging the kind of bus cycles to be currently performed, a register for storing a plurality of wait cycle numbers to be inserted, a wait cycle selector and decoder for selecting one of the wait cycle numbers in response to the judged kind of the bus cycle and decoding the selected wait cycle number, and a ready signal generator for responding to the decoded bus cycle number to generate the ready signal until the wait state is inserted in the bus cycle by a number designated by the decoded wait cycle number.

Recently, the data processor has been required to operate at a high speed. For this purpose, the frequency of the system clock signal is made high and the bus control unit performs each of the data read and data write bus cycles by two states. In this case, the bus control unit samples the ready signal from the wait state control unit at an intermediate time point during the second state to determine whether or not the wait state is to be inserted. This means that the wait state control unit must generate the ready signal within a time corresponding to one and a half clock cycles of the system clock signal.

However, the wait state control unit according to the prior art performs the operation thereof in a sequential manner, as described above. In other words, the wait state control unit requires a relatively long operation time for generating the ready signal. For this reason, the enhancement in the operation speed of the data processor is restricted.

SUMMARY OF THE INVENTION

Therefore, an object of the present invention is to provide a data processor having an improved wait state control circuit.

Another object of the present invention is to provide a wait state control unit which does not present the constraint on the enhancement in operation speed of a data processor.

A data processor according to the present invention includes a wait state control unit for generating a ready signal for instructing the insertion of a wait state into a bus cycle being currently performed, which unit comprises a bus cycle judgement circuit for judging the bus cycle being currently performed to produce judged bus cycle information, a register for storing a plurality of wait cycle numbers, a wait cycle selector/decoder for selecting one of the wait cycle numbers and decoding the selected wait cycle number to produce a decoded wait cycle number to be inserted, a wait cycle presence/absence detector supplied with the selected wait cycle number for detecting whether or not a wait state is to be inserted into the bus cycle being currently performed to produce a detection signal when the wait state is detected to be inserted, and a ready signal generator coupled to the wait cycle selector/decoder and the wait cycle presence/absence detector for generating the ready signal in response to the detection signal from the wait cycle presence/absence detector irrespective of the absence of the decoded wait cycle number from the wait cycle selector/decoder and continuing to generate the ready signal until the wait state is inserted into the bus cycle being currently performed by a number designated by the decoded wait cycle number.

The present invention pays attention to a fact that the wait cycle selector/decoder requires a relatively long time to decode the selected wait cycle number. Therefore, the wait cycle presence/absence detector is provided to detect whether or not the wait state is required to be inserted into the current bus cycle. Since this detector detects only the necessity of the insertion of the wait state, the detecting operation thereof is completed for a very short time. Accordingly, the ready signal generator generates the ready signal before the intermediate time point of the second state of the current bus cycle, and the ready signal thus generated is sampled at that time point. One wait state is thereby inserted into the current bus cycle. In other words, one wait state is provided after the second state. Next, sampling of the ready signal is carried out at an intermediate time point of this wait state. Before this sampling time point, the wait cycle selector/decoder completes the decoding operation to supply the decoded wait cycle number to the ready signal generator. When the decoded wait cycle number represents one, the generator withdraws the generation of the ready signal, so that a wait state is no more inserted. On the other hand, the decoded wait cycle number represents two or more, the ready signal is continued to be generated until the required number of wait states is inserted. Of course, when the wait cycle presence/absence detector does not produce the detection signal, the ready signal is not generated.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE INVENTION

Figure 1:
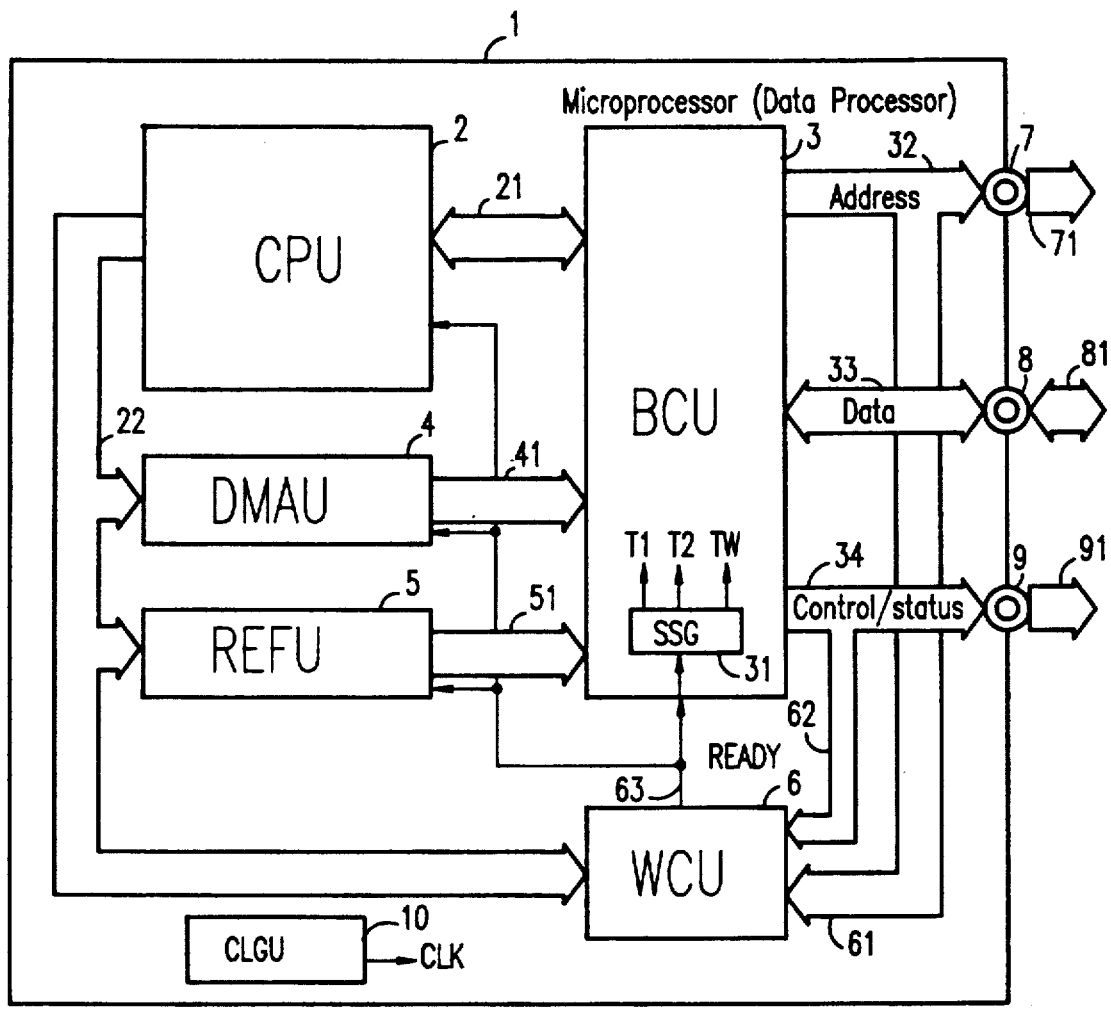
FIG. 1 is a block diagram representative of a data processor according to an embodiment of the present invention.

Referring now to FIG. 1, a microprocessor 1 as a data processor according to an embodiment of the present invention is fabricated as a semiconductor integrated circuit device and has a set of address terminals 7 coupled to a system address bus 71, a set of data terminals 8 coupled to a system data bus 81 and a set of control/status terminals 9 coupled to a system control/status bus 91. Although not shown, a memory unit storing a program and data and a plurality of peripheral I/O units are coupled to the buses 71, 81 and 91. The microprocessor 1 further includes a central processing unit (CPU) 2, a direct memory access unit (DMAU) 4, a refresh control unit (REFU) 5, a bus control unit (BCU) 3, a wait state control unit (WCU) 6 and a clock generator (CLGU) 10. CPU 2 executes a program to perform a data processing operation required by each instruction. The request for fetching each instruction and for reading or writing data from or into the memory unit and the peripheral I/O units is transferred via a bus 21 from CPU 2 to BCU 3. DMAU 4 performs a data transfer operation between the memory unit and the peripheral I/O unit in place of CPU 2. The request for the DMA data transfer is supplied via a bus 41 to BCU 3. REFU 5 performs a refresh operation on a dynamic random access memory (DRAM) constituting one part of the memory unit. The request for the refresh operation is supplied to BCU 3 via a bus 51. CPU 2 writes or sets control and/or parameter data into DMAU 4, REFU 5 and WCU 6 via a bus 22. CLGU 10 generates a system clock signal CLK which is supplied to CPU 2, BCU 3, DMAU 4, REFU 5 and WCU 6. BCU 3 responds to the respective requests from CPU 2, DMAU 4 and REFU 5 and performs a bus cycle for those requests by driving internal address, data and control/status buses 32, 33 and 34 which are in turn coupled to the system buses 71, 81 and 91 via the corresponding sets of terminals 7, 8 and 9, respectively. In this embodiment, BCU 3 basically performs each of bus cycles in two states T1 and T2, each of which corresponds to one cycle period of the system clock CLK. Included in BCU 3 is a state signal generator (SSG) 31 for generating a first state signal T1 and a second state signal T2. The first state T1 is allocated to the generation of the address information and the control/status information and the second state is allocated to the data output or data fetching state. In order to control or prolong a period of one bus cycle, WCU 6 responds to the address information supplied via a branch bus 61 from the bus 32 and status information supplied via a branch bus 62 from the bus 34 and generates a ready signal 63. The SSG 31 samples the level of the ready signal 63 at an intermediate point of the second state T2. When the sampled ready signal is at a high level, SSG 31 generates a wait state signal TW after the second state T2. The wait state TW also corresponds to one cycle period of the system clock CLK. The wait state TW is inserted repeatedly so long as the ready signal is at the high level. The ready signal 63 is further supplied to CPU 2, DMAU 4 and REFU 5 to inform that the wait state TW is inserted into the bus cycle.

Figure 2:
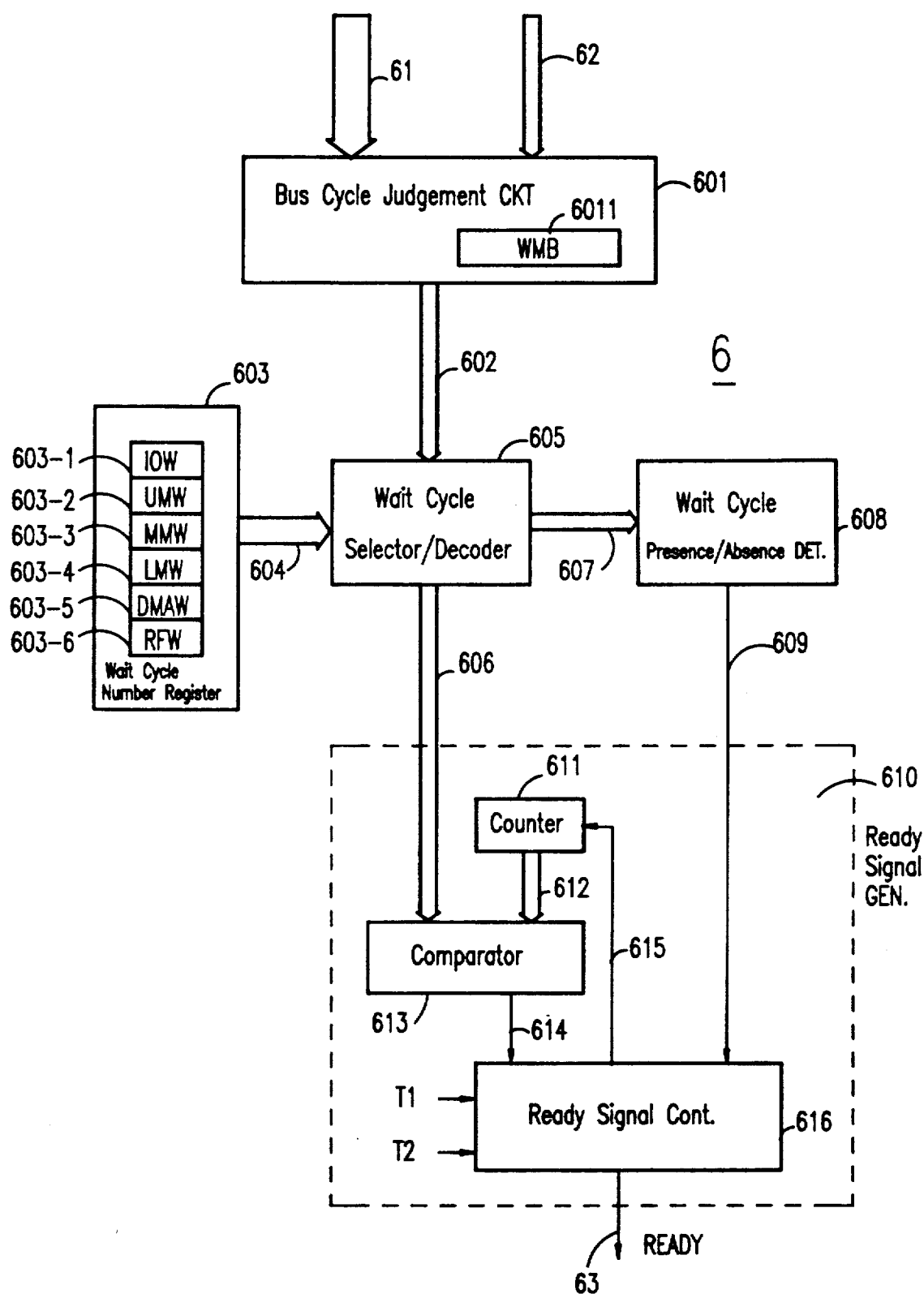
FIG. 2 is a block diagram representative of a wait state control unit (WCU) shown in FIG. 1.

Referring to FIG. 2, WCU 6 includes a bus cycle judgement circuit 601, a wait cycle number register 603, a wait cycle selector/decoder 605, a wait cycle presence/absence detector 608 and a ready signal generator 610. The bus cycle judgement circuit 601 judges a bus cycle being currently performed in response to the information from the branch buses 61 and 62. In this embodiment, the circuit 601 judges basically four kinds of bus cycles: the first bus cycle is a memory bus cycle for accessing the external memory unit, the second bus cycle is a I/O bus cycle for accessing the peripheral I/O units; the third bus cycle is a DMA bus cycle for a DMA data transfer; and the fourth bus cycle is a refresh bus cycle for a DRAM refresh operation. These four bus cycles can be judge by the status information via the bus 62. The circuit 601 includes a memory boundary register (WMB) 6011 storing boundary data for dividing a memory space into three blocks, i.e. a lower, a middle and an upper memory block. The boundary data can be rewritten by CPU 2 through an instruction. Accordingly, the memory bus cycle is further classified into three bus cycles: the first one is a lower memory bus cycle for accessing the lower memory block; the second one is a middle memory bus cycle for accessing the middle memory block; and the third one is an upper memory bus cycle for accessing the upper memory block. The memory block to be accessed can be detected in response to the address information from the bus 61. As a result, six kinds of bus cycles are judged by the judgement circuit. The judged data 602 generated by the circuit 601 is supplied to the wait cycle selector/decoder 605 which is further supplied with data 604 representative of wait cycle numbers from a wait cycle number register 603. This register 603 includes a plurality of storage regions 603-1 to 603-6 (six in this embodiment). Each of the storage regions 603-1 to 603-6 stores data representative of a wait cycle number to be inserted into the bus cycle, which data is set and rewritten by CPU 2 through instructions. The storage regions 603-1 to 603-6 correspond to the above-mentioned six bus cycles, respectively, and thus store wait cycle number data IOW for the I/O bus cycle, UMW for the upper memory bus cycle, MMW for the middle memory bus cycle, LMW for the lower memory bus cycle, DMAW for the DMA bus cycle and RFW for the refresh bus cycle. Each of these wait cycle number data IOW to RFW consists of 2 bits in this embodiment and thus can set the number of wait states to be inserted from 0 to 3. The wait cycle selector/decoder 605 selects one of the number data 604 in response to the information 602 from the bus cycle judgement circuit 601 and then decodes the selected wait cycle number data to produce the decoded wait state number 606. The selected wait cycle number is further supplied as data 607 to a wait cycle presence/absence detector 608. This detector 608 detects whether or not the selected wait cycle number data 607 is zero, i.e., whether or not a wait state is required to be inserted into the current bus cycle. This detection output is derived as a signal 609 which takes a high level when the selected wait cycle number data 607 is not zero.

Figure 3:
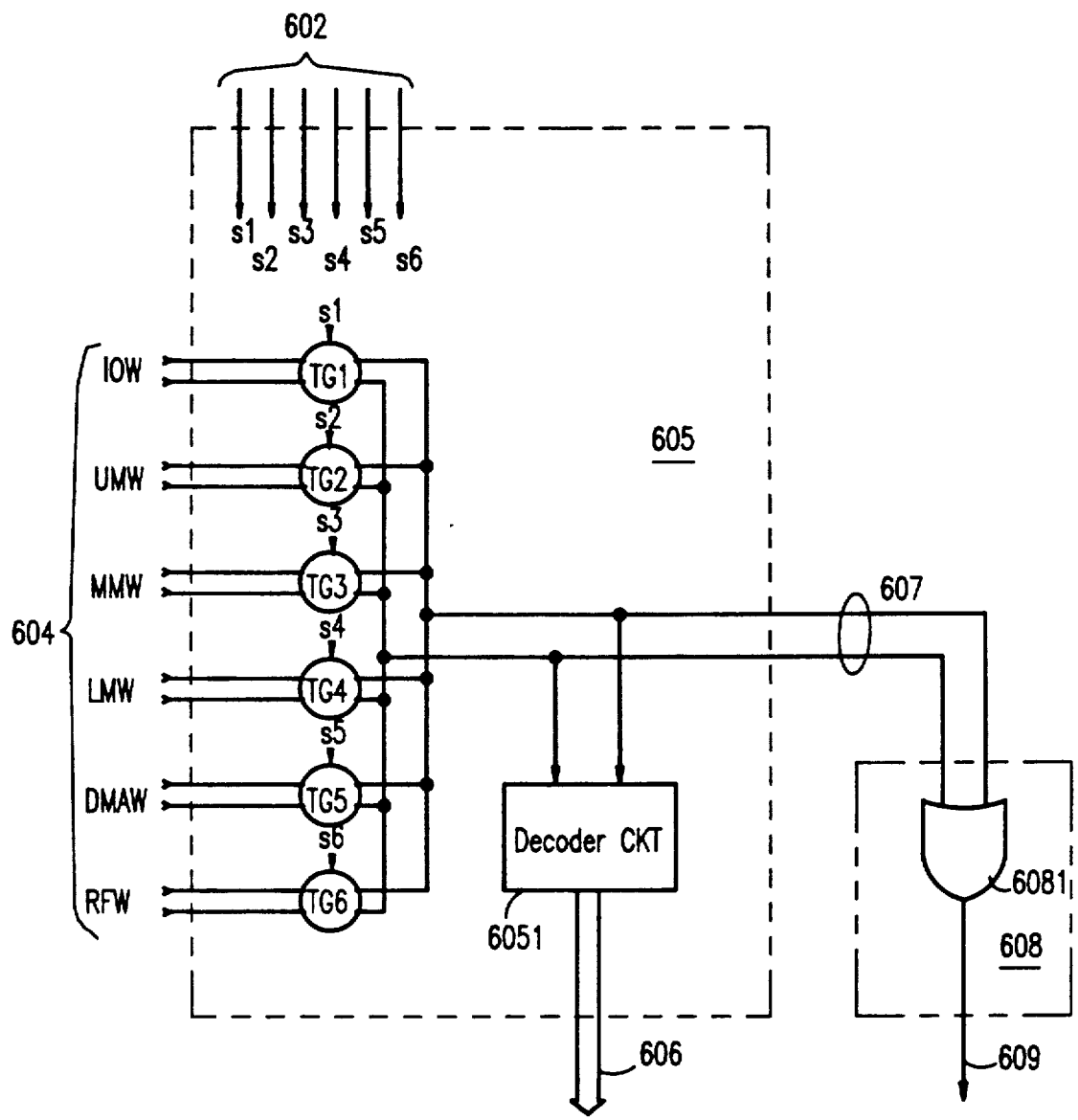
FIG. 3 is an internal circuit diagram representative of a wait cycle selector/decoder and a wait cycle presence/absence detector shown in FIG. 2.

Turning to FIG. 3, the wait cycle selector/decoder 605 includes six transfer gates TG1 to TG6 supplied with wait cycle number data IOW to RFW, respectively. Each of the transfer gates TG1 to TG6 is made open when the associated one of selection signals S1 to S6 takes an active level. These selection signals S1 to S6 are supplied with the bus cycle judgement circuit 601 as the judged data 602. For example, when the judgement circuit judges that the current bus cycle is the I/O bus cycle, only the selection signal S1 takes the active level to open the transfer gate TG1. The wait cycle number data IOW for the I/O bus cycle is thereby selected. The wait cycle number data thus selected is supplied to a decoder circuit 6051 and then decoded to the number of wait states 606 to be inserted into the bus cycle. The selected wait cycle number data is further supplied to an OR gate 6081 as the wait cycle presence/absence detector 608. Accordingly, so long as the selected wait cycle number data is not zero, the detection signal 609 takes the high level. Only when the wait cycle number to be inserted is zero does the signal 609 takes the low level.

Turning back to FIG. 2, the decoded wait state number 606 and the detection signal 609 are supplied to a ready signal generator 610. This generator 610 includes a counter 611 counting a pulse signal 615, a comparator 613 which compares the decoded wait state number 606 with the content 612 of the counter 611 to produce a comparison output signal 614 that takes the low level when the wait state number 606 is coincident with the counter number 612, and a ready signal controller 616. This controller 616 responds to T1 and T2 state signals, the detection signal 609 and the comparison output signal 614 and controls the level of the ready signal 63 as well as the generation of the count pulse signal 615.

Figure 4:
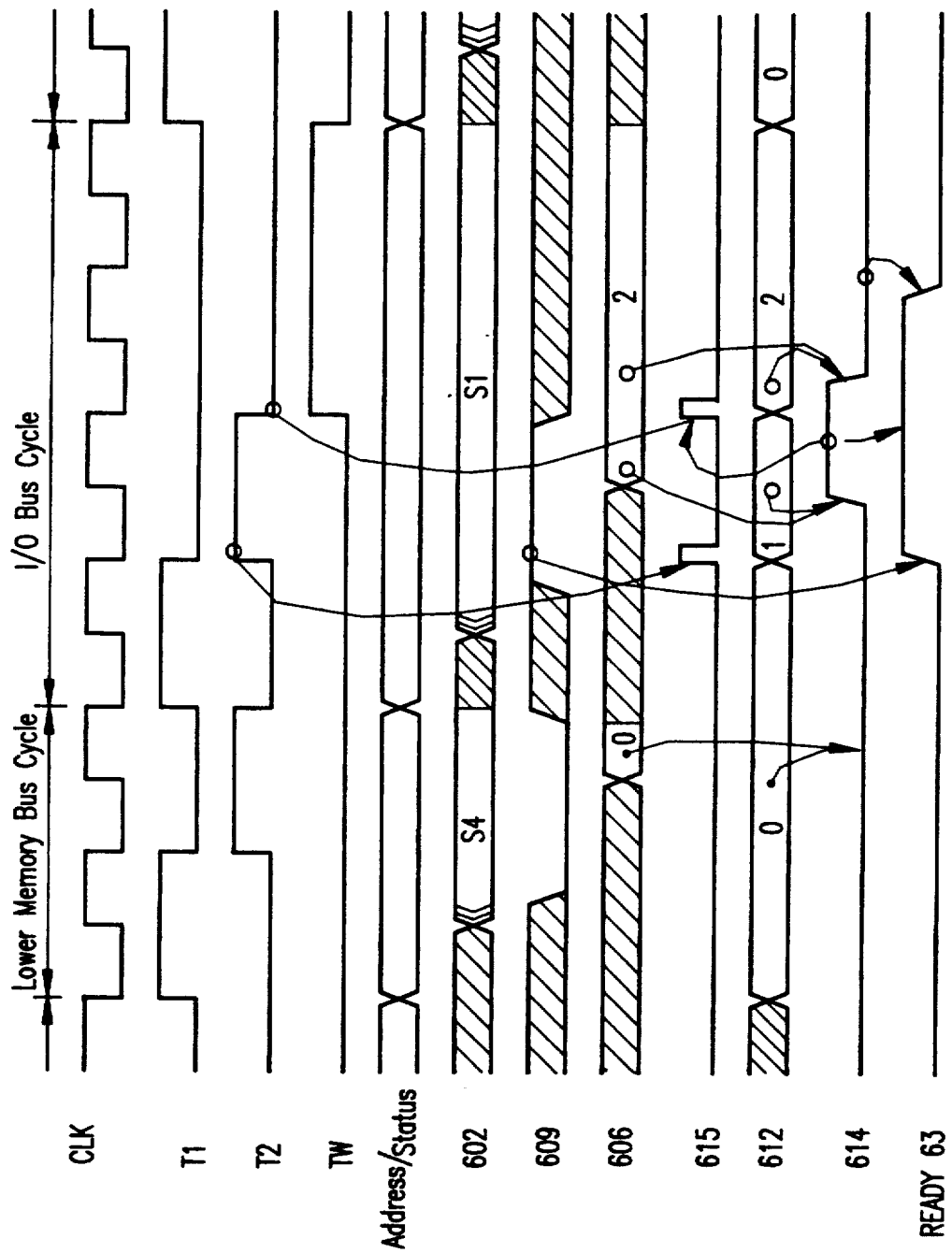
FIG. 4 is a timing chart representative of an operation of WCU.

Next, an operation will be described below with reference to FIGS. 1 to 3 and further to FIG. 4. Assume that BCU 3 initiates the lower memory bus cycle. At the beginning of T1 state, therefore, the address and status information is changed, so that the bus cycle judgement circuit 601 changes the selection signal S4 to the active level. The wait cycle number data LMW for the lower memory bus cycle is thereby selected and supplied to the OR gate 6081. In this description, the wait cycle number data LMW is zero to represent the wait state required to be inserted in the lower memory bus cycle. Accordingly, the detection signal 609 from the wait cycle presence/absence detector 608 takes the valid low level during the T1 state. The ready signal generator 610 thus holds the ready signal at the low level. The selected wait cycle number data LMW is further supplied to the decoder circuit 6051. While the decoder circuit 6051 decodes the wait cycle number data LMW, it requires a relatively long time for decoding the wait cycle number data, so that the decoded wait state number 606 appears at a later part of the T2 state, as shown in FIG. 4. On the other hand, SSG (state signal generator) 31 samples the level of the ready signal 63 in synchronism with the raising edge of the clock signal CLK during T2 state. Since the ready signal 63 is at the low level, a wait state TW is not generated. Since the wait cycle number data LMW is zero, no problem occurs.

On the next bus cycle, an I/O bus cycle in the present description, is thus initiated. The bus cycle judgement circuit 601 changes the selection signal S1 to the active level. The wait cycle number data IOW is thereby selected and supplied to the wait cycle presence/absence detector 608, the OR gate 6081. This data IOW represents a wait cycle number of 2, so that the detection signal 609 is changed to the high level during the T1 state. In response thereto the ready signal controller 616 changes the ready signal 63 to the high level at the beginning of the T2 state and further generates the count pulse 615. The counter 611, which is reset to zero each time one bus cycle is initiated, thereby increments the contents thereof. At this time, the decoded wait state number 606 is not yet produced by the decoder 6051, as mentioned above. In synchronism with the leading edge of the clock CLK during the T2 state, SSG 31 samples the high level ready signal 63 and thus produces the wait state TW after the T2 state. The decoded wait state number 606 is produced and supplied to the comparator 613 during the T2 state. Since the number 606 is not equal to the counter content 612, the comparator 613 produces the high level output 614. The ready signal controller 616 then responds to the signal 614 in place of the detection signal 609. Since the signal 614 is at the high level, the ready signal 63 is held at the high level during the first wait state TW and the count pulse 615 is generated again at the beginning of wait state TW. Since the counter 611 further increments the content thereof by one, the comparison output signal 614 is changed to the low. On the other hand, SSG 31 samples the high level ready signal 63 at the leading edge of the clock CLK during first wait state TW, so that a second wait state TW is further inserted after the first wait state. Since the comparison signal 614 is at the low level, the ready signal 63 is changed to the low level at the beginning of the second wait state TW. SSG 31 samples the low level ready signal 63 at the leading edge of the clock CLK during the second wait state TW, so that another wait state is not inserted. The next bus cycle is then initiated.

In the above description, when the number represented by the wait cycle number data is 1, the signal 614 is held at the low level, so that the second wait state TW is omitted. In case of the wait state number representing 3, the high level signal 614 is held at the high level until the second wait state TW starts, so that a third wait state TW is inserted.

Thus, by the provision of the wait cycle presence/absence detector 608, the control for insertion of a wait state can be carried out even when the BCU 3 basically performs each bus cycle in two states T1 and T2.

It is apparent that the present invention is not limited to above embodiment, but may be modified and changed without departing from the scope and spirit of the invention. For example, the number of kinds of bus cycle judged by the judgement circuit can be increased and the wait state number represented by the data IOW to RFW can be also increased.

What is claimed is:

1. A data processor including a central processing unit, a bus control unit coupled to said central processing unit for performing a bus cycle in response to a request from said central processing unit, and a wait state control unit coupled to said bus control unit for generating a ready signal for instructing said bus control unit to insert a wait state into a bus cycle being currently performed, said wait state control unit comprising:

first means coupled to said bus control unit for judging said bus cycle being currently performed to produce judged bus cycle information;

storage means for storing a plurality of wait cycle number data each representative of a number of wait states to be inserted into a bus cycle;

second means coupled to said first means and to said storage means and responsive to said judged bus cycle information for selecting one of said plurality of wait cycle number data to produce a selected wait cycle number data;

third means coupled to said second means and responsive to said selected wait cycle number data for producing a wait state number to be inserted;

fourth means coupled to said second means to receive said selected wait cycle number data for producing a detection signal when said selected wait cycle number data is not zero before said third means produces said wait state number; and fifth means coupled to said fourth means for generating said ready signal in response to said detection signal irrespective of absence of said wait state number from said third means, said fifth means being further coupled to said third means to receive said wait state number and continuing to generate said ready signal to cause said bus control unit to insert into said bus cycle being currently performed a predetermined number of wait states corresponding to said wait state number from said third means.

2. The data processor recited in claim 1 wherein said fifth means comprises:

ready signal control means coupled to said fourth means and responsive to said detection signal for generating said ready signal, said ready signal control means further generating count pulses for each wait state inserted in a current bus cycle;

counter means coupled to said ready signal control means and responsive to said count pulses for generating a count output, said count means being reset at a beginning of a bus cycle; and comparator means coupled to said third means and said counter means and responsive to said wait state number from said third means and to said count output from said counter means for generating a comparison output to said ready signal control means indicating that no more wait states are to be inserted into said current bus cycle.

3. The data processor recited in claim 1 wherein said fourth means is an OR gate responsive to wait cycle number data selected by said second means.

4. A data processor comprising a central processing unit, a bus control unit coupled to said central processing unit for performing a bus cycle with first and second states in response to a request from said central processing unit, and a wait state control unit coupled to said bus control unit for generating a ready signal for commanding said bus control unit to insert a wait state into a bus cycle being currently performed, said bus control unit including means for sampling said ready signal at an intermediate time point during said second state to determine whether or not said wait state is to be inserted, said wait state control unit comprising:

a ready signal generation means for generating said ready signal;

detection means coupled to said bus control unit and responsive to said bus cycle being currently performed for detecting whether or not a wait state is to be inserted into said bus cycle being currently performed and for producing, when the wait state is detected to be inserted into said bus cycle being currently performed, first information representing that the wait state is to be inserted and second information representative of a number of wait states to be inserted, said first information being produced before said intermediate time point during said second state and said second information being produced after said intermediate time point during said second state;

means coupled to said detection means and said ready signal generation means for causing said ready signal generation means to generate said ready signal before said intermediate time point during said second state in response to said first information; and means coupled to said detection means and said ready signal means and responsive to said second information for causing said ready signal generation means to continue to generate said ready signal so that a wait state is inserted into said bus cycle corresponding to said number represented by said second information.

5. The data processor recited in claim 4 wherein said detection means comprises:

storage means for storing a plurality of wait cycle number data each representative of a number of wait states to be inserted into a bus cycle;

selecting means coupled to said storage means and said bus control unit for selecting one of said plurality of wait cycle number data to produce a selected wait cycle number data; and means coupled to said selecting means for producing said second information representative of said number of wait states.

6. The data processor recited in claim 5 wherein said detection means further comprises means coupled to said selecting means and responsive to said selected wait cycle number data for producing said first information when said selected wait number data is not zero.

7. The data processor recited in claim 6 wherein said means for producing said first information comprises an OR gate.

8. The data processor recited in claim 6 wherein said ready signal generation means comprises:

ready signal control means responsive to said first information for generating said ready signal, said ready signal control means further generating a number of count pulses corresponding to a number of wait states to be inserted in a current bus cycle, a first one of said count pulses being generated at a beginning of said second state;

counter means coupled to said ready signal control means and responsive to said count pulses for generating a count output, said counter means being reset at a beginning of a bus cycle; and comparator means coupled to said mans for producing said second information and said counter means and responsive to said second information representative of said number of wait states to be inserted in the current bus cycle and to said count output from said counter means for generating a comparison output to said ready signal control means indicating that no more wait states are to be inserted into said current bus cycle.

9. A data processor comprising:

a central processing unit issuing a bus cycle request;

a bus control unit coupled to said central processing unit and performing a bus cycle in response to said bus cycle request; and a wait cycle control unit coupled to said bus control unit and generating a ready signal for causing said bus control unit to insert a wait state into a current bus cycle, said wait cycle control unit including:

storage control means for temporarily storing a plurality of wait cycle number data each representative of a number of wait states to be inserted into a bus cycle;

selector means coupled to said bus control unit and said storage means for selecting one of said plurality of wait cycle number data in response to said current bus cycle to thereby produce selected wait cycle number data;

decoder means coupled to said selector means for decoding said selected wait cycle number data to produce a wait state number representative of a number of wait states to be inserted into said current bus cycle;

detector means coupled to said selector means to receive said selected wait cycle number data for detecting whether or not the number of wait states represented by said selected wait cycle number data is zero and for changing an output signal thereof to an active level when the number of wait states represented by said selected wait cycle number data is not zero, said output signal being changed to said active level before said decoder means produces said wait state number;

a ready signal generator having a set of first terminals coupled to said decoder means to receive said wait state number and a second terminal coupled to said detector means to receive said output signal, said ready signal generator generating said ready signal in response to said active level of said output signal irrespective of absence of said wait state number at said set of first terminals and thereafter determining whether or not said ready signal is to be continued to generate in response to said wait state number at said set of first terminals.

* * * * *